Feb. 12, 1957 L. D. BOYCE Re. 24,274

CARBURETOR DE-ICING MEANS

Original Filed Oct. 18, 1951 2 Sheets-Sheet 1

INVENTOR.
LEONARD D. BOYCE
BY George R. Erickson
ATTORNEY

CARBURETOR DE-ICING MEANS

Original Filed Oct. 18, 1951 2 Sheets-Sheet 2

INVENTOR.
LEONARD D. BOYCE
BY
George R. Ericson
ATTORNEY

United States Patent Office

Re. 24,274
Reissued Feb. 12, 1957

24,274

CARBURETOR DE-ICING MEANS

Leonard D. Boyce, Kirkwood, Mo., assignor, by mesne assignments, to ACF Industries, Incorporated, New York, N. Y., a corporation of New Jersey Original No. 2,715,520, dated August 16, 1955, Serial No. 251,976, October 18, 1951. Application for reissue February 27, 1956, Serial No. 568,147

6 Claims. (Cl. 261—14)

Matter enclosed in heavy brackets [ ] appears in the original patent but forms no part of this reissue specification; matter printed in italics indicates the additions made by reissue.

This invention relates to carburetors for internal combustion engines, and more particularly to means for preventing the formation of ice in the vicinity of the throttle valve and idle ports thereof.

In conventional carburetors having a throttle valve and idle ports adjacent thereto, when the throttle valve is opened only slightly, the entering air-fuel mixture, upon passing the throttle valve, expands rapidly due to the depression posterior to the throttle valve, and moisture in the air condenses and freezes on the surface of the throttle valve and on the mixture conduit walls around the throttle shaft and in the vicinity of the idle ports. This condition may result in stalling of the engine due to restricting the air flow past the throttle valve, and is therefore highly objectionable.

It is accordingly an object of the invention to provide improved means for preventing the formation of ice in carburetors.

It is a further object to provide novel means for introducing a heated fluid into the wall structure of the carburetor adjacent the throttle valve.

It is a further object to provide means whereby such heated fluid is only introduced when needed, that is, when the throttle valve is opened slightly more than necessary for normal idle.

It is a further object to provide means whereby the supply of heated fluid may be automatically interrupted when the temperature of the carburetor wall structure adjacent the throttle valve exceeds a predetermined value.

These and other objects and advantages are attained by providing the mixture conduit wall structure with a system of hot air passages substantially surrounding the portion thereof adjacent the throttle valve, and discharging into the conduit through an outlet immediately above the throttle valve, so that as soon as the throttle valve is slightly opened, the outlet is opened to manifold suction. Means are provided for introducing into the passage system heated air from a fluted heat exchange tube passing through the exhaust manifold, and a thermostatically controlled valve is provided to regulate the admission of heated air into the passage system.

Referring to the drawings:

Fig. 2 is a vertical section through the heat exchange tube shown in Fig. 1.

Fig. 3 is a transverse section through Fig. 2 along the line 3—3.

Figure 1:
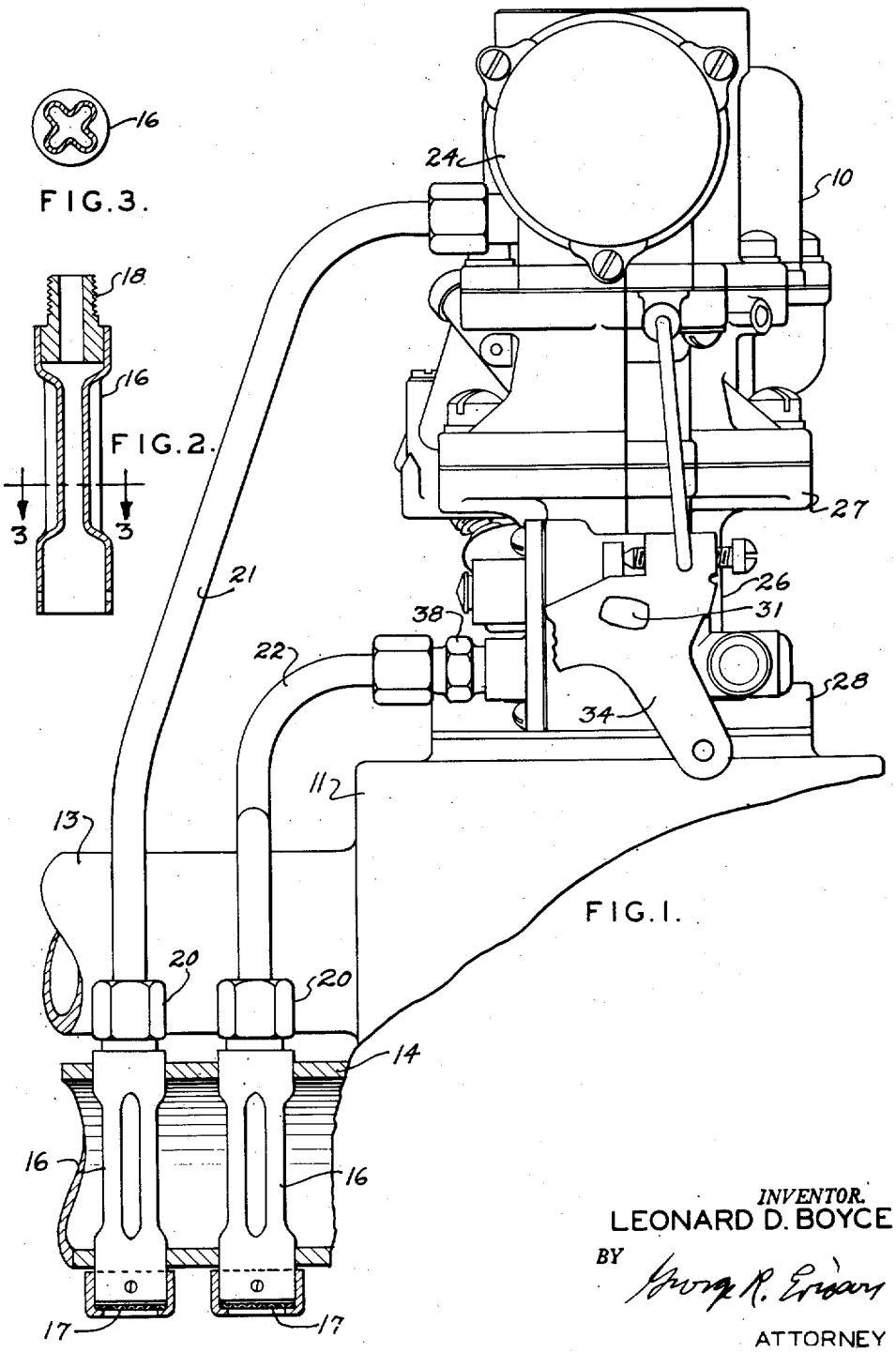
Fig. 1 shows a carburetor incorporating my invention, and a portion of the manifold of an internal combustion engine.
Figure 4:
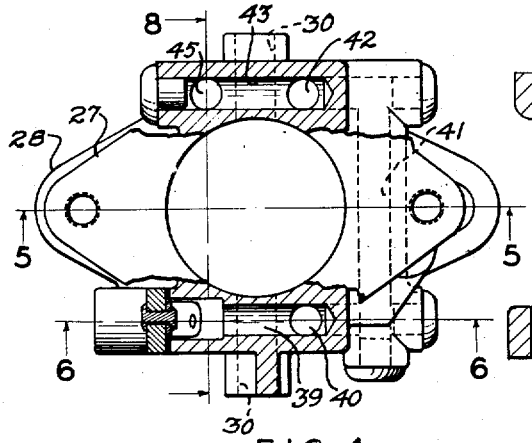
Fig. 4 is a partial horizontal sectional view showing the heat passages in the carburetor wall structure and the heat admission valve.
Figure 5:
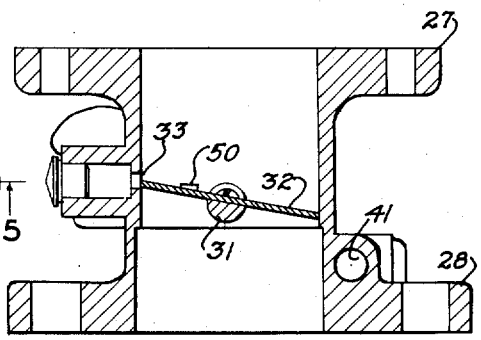
Fig. 5 is a vertical section along the line 5—5 of Fig. 4.
Figure 6:
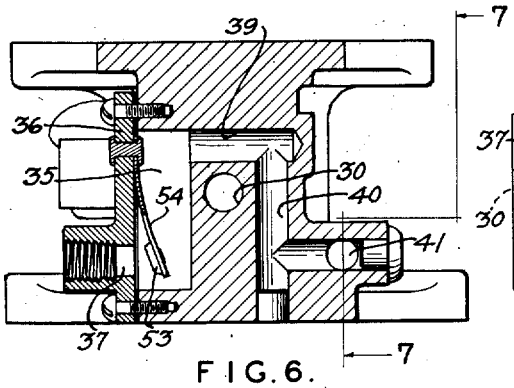
Fig. 6 is a vertical section along the line 6—6 of Fig. 4.
Figure 7:
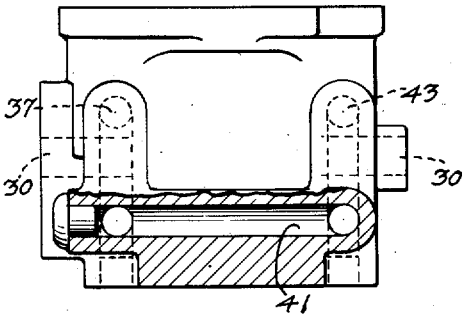
Fig. 7 is a partial vertical section along the line 7—7 of Fig. 6.
Figure 8:
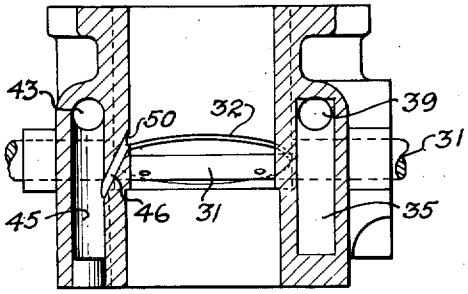
Fig. 8 is a vertical sectional view along the line 8—8 of Fig. 4.

In the drawing the numeral 10 refers to a downdraft carburetor mounted on the hot spot 11 of an internal combustion engine having an intake manifold 13 and an exhaust manifold 14. Fluted heat exchange tubes 16, as disclosed in my co-pending application S. N. 28,896, filed May 24, 1948, now Patent No. 2,608,389, dated August 26, 1952, pass through exhaust manifold 14, and have a screened air inlet opening 17 at their lower end, and at their upper end an outlet nipple 18 threaded to receive fitting 20, by means of which heat conducting tubes 21 and 22 are secured to the heat exchange tubes. Tube 21 is secured at its opposite end to the housing 24 of an automatic choke control device, as described in my abovementioned co-pending application, now Patent No. 2,608,389.

The lower portion 26 of the carburetor mixture conduit wall structure has upper and lower flanges 27 and 28, for attachment, respectively, to the upper portion of carburetor and to the intake manifold 13, and is formed with transverse journal openings 30 for shaft 31 on which disk-type throttle valve 32 is secured. A conventional idle port is shown at 33, opening into the mixture conduit adjacent the edge of the closed throttle valve. Throttle opening and closing movement are regulated by throttle operating arm 34, which is rigidly secured to one end of throttle shaft 31.

The wall structure of the mixture conduit is considerably thickened in the vicinity of the throttle valve to permit the location therein of a plurality of connected passageways substantially surrounding each end of the throttle shaft and the mixture conduit adjacent the throttle valve. This system of passageways comprises a cored inlet chamber 35 closed by plate 36, which has at its lower end an opening 37 and a nipple 38 to which is secured an end of heat conducting tube 22. A horizontal passage 39 extends slightly above the throttle shaft and communicates at one end with passageway 35 and at the other end with a vertical passage 40. Vertical passage 40 communicates at some distance below the throttle shaft with a system of horizontal passages indicated at 41 connected at its opposite end with another vertical passage 42 adjacent the opposite end of the throttle shaft. Vertical passage 42 communicates at its upper end with a horizontal passage 43 adjacent to and slightly above the throttle shaft. Horizontal passage 43 communicates at its opposite end with a vertical passage 45, which is blind except for a small passage 46 which connects passage 45 below the throttle shaft with the mixture conduit immediately above the throttle plate, as at 50, so that, when the throttle is opened slightly, heated air will be drawn from heat exchange tube 16, through tube 22 and opening 37 through chamber 35, passageways 39, 40, 41, 42, 43, 45, and 46 into mixture conduit. The heated air thus circulated through the passageway system heats the entire mixture conduit wall structure and prevents the formation of ice on the throttle plate, throttle shaft, and the mixture conduit wall.

For shutting off the supply of heated air when the wall structure is heated to a predetermined temperature, a thermostatic valve is provided to regulate opening 37 in closure plate 36. This valve consists of a frusto-conical plug 53 affixed to the free end of a bi-metal strip 54 for sealing registry with opening 37. The opposite end of bi-metal strip 54 is secured to the inner surface of plate 36, so that the free end moves plug 53 toward closed position as temperature increases, substantially fully closing opening 37 when the temperature within chamber 35 exceeds a predetermined value.

Operation of the device is as follows: When the throttle valve is opened a predetermined slight amount, outlet 50 is placed in communication with manifold vacuum posterior to the throttle valve so that air is drawn into fluted tube 16, heated and drawn therefrom through tube 22, and opening 37 through passage system 35—46, thereby heating the adjacent mixture conduit wall structure and preventing formation of ice.

The invention may be modified as will occur to those skilled in the art, and exclusive use of all modifications as come within the scope of the appended claims is contemplated.

I claim:

1. In a carburetor, a mixture conduit having a throttle valve therein, a heating jacket adjacent said throttle valve having a passage communicating with a port in said mixture conduit anterior of the throttle valve when in closed position, and posterior of said valve in the part-throttle range of operation, an inlet for said heating jacket adapted for connection to a source of heated air, a valve for controlling said inlet arranged to open in the direction of flow through said jacket to said port, and flexible, heat responsive means for mounting said valve constructed and arranged to close said valve at high temperatures, and to open said valve at low temperatures.

2. In an internal combustion engine having an intake and exhaust manifolds, a carburetor having a mixture conduit communicating with said intake manifold, a throttle valve in said mixture conduit, a shaft having spaced journaled portions in the wall structure of said conduit for mounting said throttle valve, inverted U-shaped ducts formed in the wall structures about said journals and straddling said journals, a pair of legs of the U-shaped ducts being connected by a communicating passageway, another leg of one of the U-shaped ducts being provided with an inlet opening for the admission of heated air from said exhaust manifold, a thermostatically controlled valve arranged in the last-mentioned duct leg for regulating the opening of said inlet, and a discharge passageway in the other leg of the other U-shaped duct discharging into the mixture conduit.

*3. In a charge forming device for an internal combustion engine having a source of heated gases, an induction conduit provided with a throttle valve, main and idling fuel passages to discharge fuel into said conduit anterior and posterior of said valve, respectively, when the valve is in its idling position, de-icing means comprising a gas passage leading from said source to a port in the wall of said conduit, said port being disposed anterior to said throttle when the latter is in its idling position and thereby being substantially ineffective to supply heated gases to said conduit, said port being disposed posterior to said valve when the latter is opened slightly from its idling position to cause heated gases to flow by suction into said conduit adjacent the posterior side of the valve whereby the formation of ice on the valve and the wall of the conduit adjacent thereto is prevented.*

*4. The device of claim 3, wherein said throttle valve is provided with a shaft journaled at its ends in the wall of said conduit, and said gas passage extends within portions of said conduit wall adjacent the ends of said shaft.*

*5. In a charge forming device for an internal combustion engine having a source of heated gases, an induction conduit provided with a throttle valve, main and idling fuel passages to discharge fuel into said conduit anterior and posterior of said valve, respectively, when the valve is in its idling position, de-icing means comprising a gas passage leading from said source to a port in the wall of said conduit, said port being disposed anterior to said throttle when the latter is in its idling position and thereby being substantially ineffective to supply heated gases to said conduit, said port being disposed posterior to said valve when the latter is opened slightly from its idling position to cause heated gases to flow by suction into said conduit adjacent the posterior side of the valve whereby the formation of ice on the valve and the wall of the conduit adjacent thereto is prevented, and valve means controlling the flow of heated gases through said gas passage into said conduit.*

*6. In a charge forming device for an internal combustion engine having a source of heated gases, an induction conduit having a throttle valve journaled therein for pivotal movement between an idling position and a full open position, de-icing means comprising a port in the wall of said conduit disposed anterior to said throttle valve when the latter is disposed in its idling position, said port being disposed posterior to said throttle valve when the latter is opened slightly from its idling position, and a gas passage leading from said source of heated gases to said port for inducing the flow of heated gases into said conduit when said throttle valve is opened slightly from its idling position, so as to substantially reduce icing of the throttle valve and the portion of the wall of the conduit adjacent thereto.*

References Cited in the file of this patent or the original patent

UNITED STATES PATENTS

| | | |
|---|---|---|
| 1,207,029 | Guthrie | Dec. 5, 1916 |
| 1,276,124 | Scott | Aug. 20, 1918 |
| 1,977,809 | Sutter | Oct. 23, 1934 |
| 2,066,003 | Heftler | Dec. 29, 1936 |
| 2,098,575 | Flamini | Nov. 9, 1937 |
| 2,269,706 | Brown | Jan. 13, 1942 |
| 2,287,593 | Ball | June 23, 1946 |
| 2,684,058 | Boyce | July 20, 1954 |
| 2,693,175 | Hickok et al. | Nov. 2, 1954 |